(12) United States Patent
Meskendahl et al.

(10) Patent No.: US 8,747,934 B2
(45) Date of Patent: *Jun. 10, 2014

(54) MOULDING

(75) Inventors: Dirk Meskendahl, Kranenburg (DE); Hendricus Franciscus Jacobus Maria van der Eerden, Gemert (NL)

(73) Assignee: Stork Titan B.V., Boxmeer (NL)

(*) Notice: Subject to any disclaimer, the term of this patent is extended or adjusted under 35 U.S.C. 154(b) by 449 days.

This patent is subject to a terminal disclaimer.

(21) Appl. No.: 12/886,933

(22) Filed: Sep. 21, 2010

(65) Prior Publication Data

US 2011/0014344 A1    Jan. 20, 2011

Related U.S. Application Data

(63) Continuation of application No. 11/579,882, filed as application No. PCT/NL2005/000311 on Apr. 26, 2005, now Pat. No. 7,819,650.

(30) Foreign Application Priority Data

May 11, 2004 (NL) ..................................... 1026171

(51) Int. Cl.
*A22C 7/00* (2006.01)
*B29C 43/08* (2006.01)
*B08B 1/00* (2006.01)
*B08B 3/00* (2006.01)

(52) U.S. Cl.
USPC ........ 426/512; 425/230; 425/236; 425/405.1; 425/576; 425/220

(58) Field of Classification Search
CPC ........ A22C 7/0069; B08B 1/007; B08B 1/04; B08B 3/02; B08B 3/10; B08B 9/027; B08B 9/46; B29C 43/08
USPC ......... 425/121–123, 127, 169, 171, 173, 183, 425/184, 188, 195, 210, 220, 225–227, 230, 425/236, 237, 240, 241, 351, 365, 367, 388, 425/402, 405.1, 540, 576; 426/512

See application file for complete search history.

(56) References Cited

U.S. PATENT DOCUMENTS 1,015,576 A   1/1912   Misner
2,525,135 A   10/1950  Huff
(Continued)

FOREIGN PATENT DOCUMENTS

EP   0368012 A2    5/1990
EP   2468104 A1 *  6/2012 ............... A22C 7/00
(Continued)

OTHER PUBLICATIONS

Praxair Surface Technologies; Ceramic Anilox Roll Cleaning Systems; Hard Facts; 2001; pp. 1-4.
(Continued)

*Primary Examiner* — Dimple Bodawala
(74) *Attorney, Agent, or Firm* — Birch, Stewart, Kolasch & Birch, LLP

(57) ABSTRACT

A system for moulding three-dimensional products from a mass of one or more food starting materials which are suitable for consumption, in particular human consumption, has a production device having a frame, a mould member provided with at least one mould cavity, the frame supporting the mould member, mass feed means for feeding the mass to the one or more mould cavities of the mould member. The system also has at least one cleaning device for cleaning one or more parts of the production device which come into contact with the mass. The mould member is removable from the frame. The system has a storage device for storing a plurality of mould members, which may be provided with an identification, has recognition means for recognizing the identification of a mould member, and may have a memory for storing at least one history of a mould member.

37 Claims, 13 Drawing Sheets

(56) References Cited

U.S. PATENT DOCUMENTS

Figure 1:
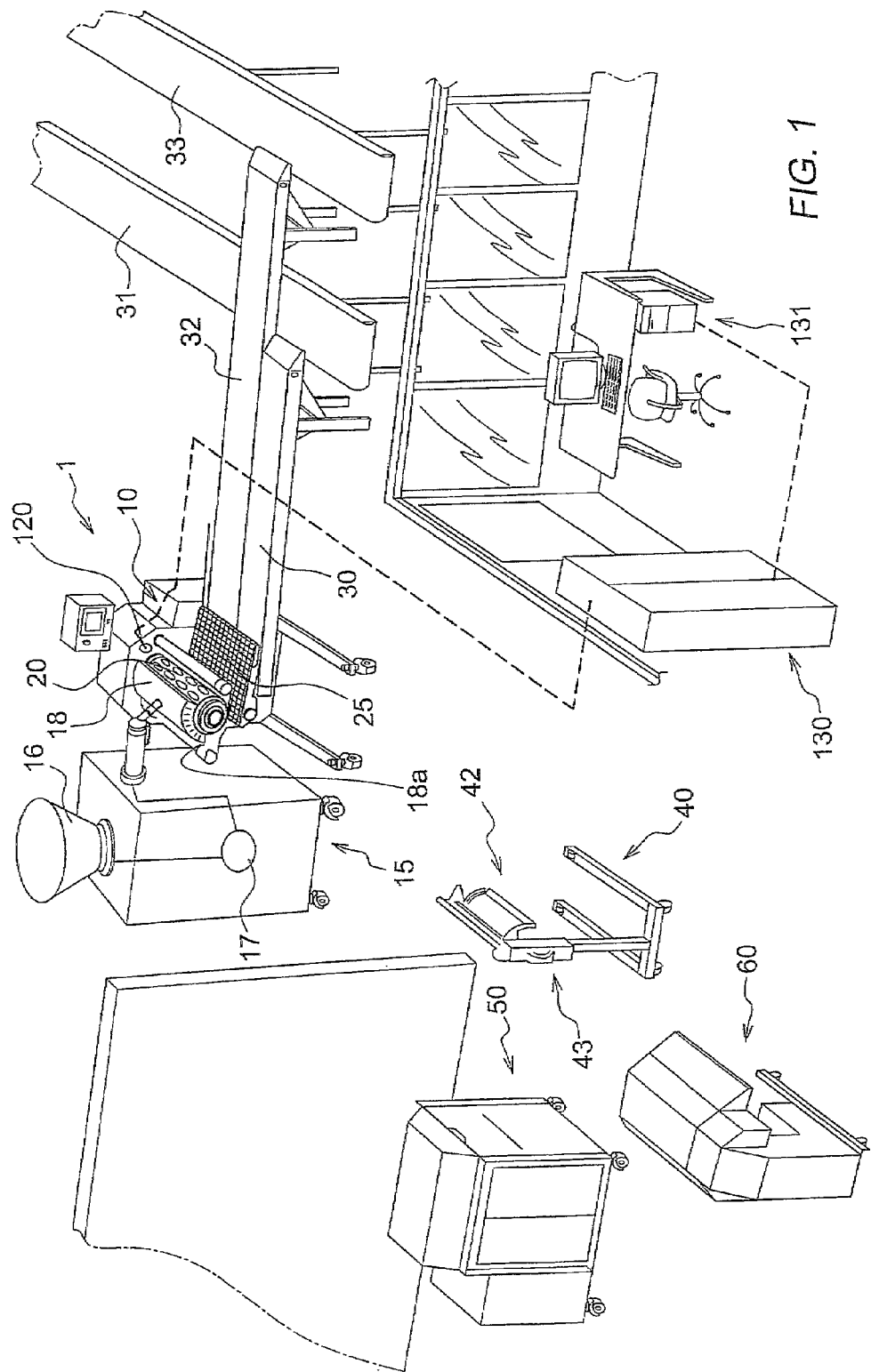

| | | | |
|---|---|---|---|
| 2,628,378 A | 2/1953 | Gilbert et al. | |
| 2,687,363 A | 8/1954 | Manning | |
| 3,178,791 A | 4/1965 | Dickson et al. | |
| 3,205,837 A | 9/1965 | Fay | |
| 3,262,218 A | 7/1966 | Mo | |
| 3,427,649 A | 2/1969 | Fay | |
| 3,490,391 A | 1/1970 | Vogt | |
| 3,504,639 A | 4/1970 | Lilien | |
| 3,920,369 A * | 11/1975 | Boehringer et al. | 425/253 |
| 3,954,368 A | 5/1976 | Kawakami | |
| 4,063,962 A * | 12/1977 | Arya et al. | 134/8 |
| 4,212,609 A | 7/1980 | Fay | |
| 4,261,692 A | 4/1981 | Kuby | |
| 4,348,166 A | 9/1982 | Fowler | |
| 4,571,924 A | 2/1986 | Bahrani | |
| 4,886,641 A | 12/1989 | Iwamura et al. | |
| 4,957,425 A | 9/1990 | Fay | |
| 4,975,039 A | 12/1990 | Dare et al. | |
| 5,198,233 A | 3/1993 | Kaiser | |
| 5,246,176 A * | 9/1993 | Fetzer et al. | 241/226 |
| 5,246,362 A | 9/1993 | Kobayashi et al. | |
| 5,462,425 A | 10/1995 | Kuss et al. | |
| 5,618,571 A | 4/1997 | London et al. | |
| 5,795,610 A | 8/1998 | London | |
| 6,113,475 A | 9/2000 | Masuda et al. | |
| 6,217,815 B1 * | 4/2001 | Sisbarro | 264/440 |
| 6,220,641 B1 | 4/2001 | Muniak | |
| 6,315,344 B1 | 11/2001 | Mattson et al. | |
| 6,609,041 B1 | 8/2003 | Sanka et al. | |
| 7,819,650 B2 * | 10/2010 | Meskendahl et al. | 425/230 |
| 2004/0050660 A1 | 3/2004 | Lumppio | |
| 2010/0055272 A1 * | 3/2010 | Van Esbroeck et al. | 426/389 |

FOREIGN PATENT DOCUMENTS

| | | | | |
|---|---|---|---|---|
| GB | 1 370 398 A | 10/1974 | | |
| GB | 2124967 | 2/1984 | | |
| JP | 01/056529 A | 3/1989 | | |
| JP | 01056529 A * | 3/1989 | | B29C 51/22 |
| WO | 00/30458 A1 | 6/2000 | | |
| WO | WO 00/30458 A1 | 6/2000 | | |
| WO | 2004/002229 A2 | 1/2004 | | |
| WO | WO 2004/002229 A2 | 1/2004 | | |

OTHER PUBLICATIONS

U.S. Appl. No. 4/886,441, Dec. 12, 1989, Lortz.

* cited by examiner

MOULDING

This application is a Continuation of U.S. application Ser. No. 11/579,882, filed on Nov. 8, 2006, now U.S. Pat. No. 7,819,650, which was filed as PCT Application No. PCT/NL2005/000311 on Apr. 26, 2005. PCT/NL2005/000311 claims priority to NL 1026171. All of the above-identified applications are hereby incorporated by reference as if fully set forth herein.

The first aspect of the present invention relates to a system for moulding three-dimensional products from a mass of one or more food starting materials which are suitable for consumption, in particular human consumption.

The invention is deemed suitable in particular for the moulding of products from a meat mass, such as for hamburgers and the like, but other edible masses, for example of fish, potato, dough, etc. are also conceivable.

WO 00/30458 and WO 2004/002229 have disclosed systems having a production device provided with a frame, a mould member designed as a mould drum and provided with at least one mould cavity, the frame supporting the mould member, and furthermore provided with mass feed means for feeding the mass to the one or more mould cavities of the mould member. U.S. Pat. No. 4,975,039, for example, has disclosed a system having a mould member designed as a mould plate which can move to and fro.

It is an object of the first aspect of the invention to propose measures which enhance the expedient use of systems of this type.

Moreover, it is an object of the first aspect of the invention to propose improvements in the area of the cleaning of systems of this type.

A first aspect of the invention relates to a system for moulding three-dimensional products from a mass of one or more food starting materials which are suitable for consumption in accordance with claim 1, as well as a mould drum designed and intended for a system for moulding three-dimensional products from a mass of one or more food starting materials suitable for consumption in accordance with claim 5. Further advantageous embodiments are described in the dependent claims 2-4 and 6-11.

The second aspect of the invention provides a system according to claim 12. Further advantageous embodiments are described in the dependent claims 13-58.

A third aspect of the invention relates to a system according to claim 59, the system furthermore comprising a storage device for storing a plurality of mould members. The storage device and if appropriate the further system is preferably designed as will be explained on the basis of the first aspect of the invention.

A fourth aspect of the invention relates to a system according to claim 60, in which each removable mould member is provided with an identification, and in which the system comprises recognition means for recognizing the identification of a mould member. Furthermore, the system is preferably designed as will be explained on the basis of the first aspect of the invention.

A fifth aspect of the invention relates to a system according to claim 61, in which the mould member can is removable from the frame and in which the system furthermore comprises a memory for storing at least one history of a mould member. Furthermore the system is preferably designed as will be explained on the basis of the first aspect of the invention.

The various aspects of the invention also relate to a method for moulding three-dimensional products from a mass of one or more food starting materials which are suitable for consumption, in particular human consumption, in which use is made of a system of this type.

It will be clear that the various aspects of the invention can be realized separately and/or in all possible combinations.

Figure 2:
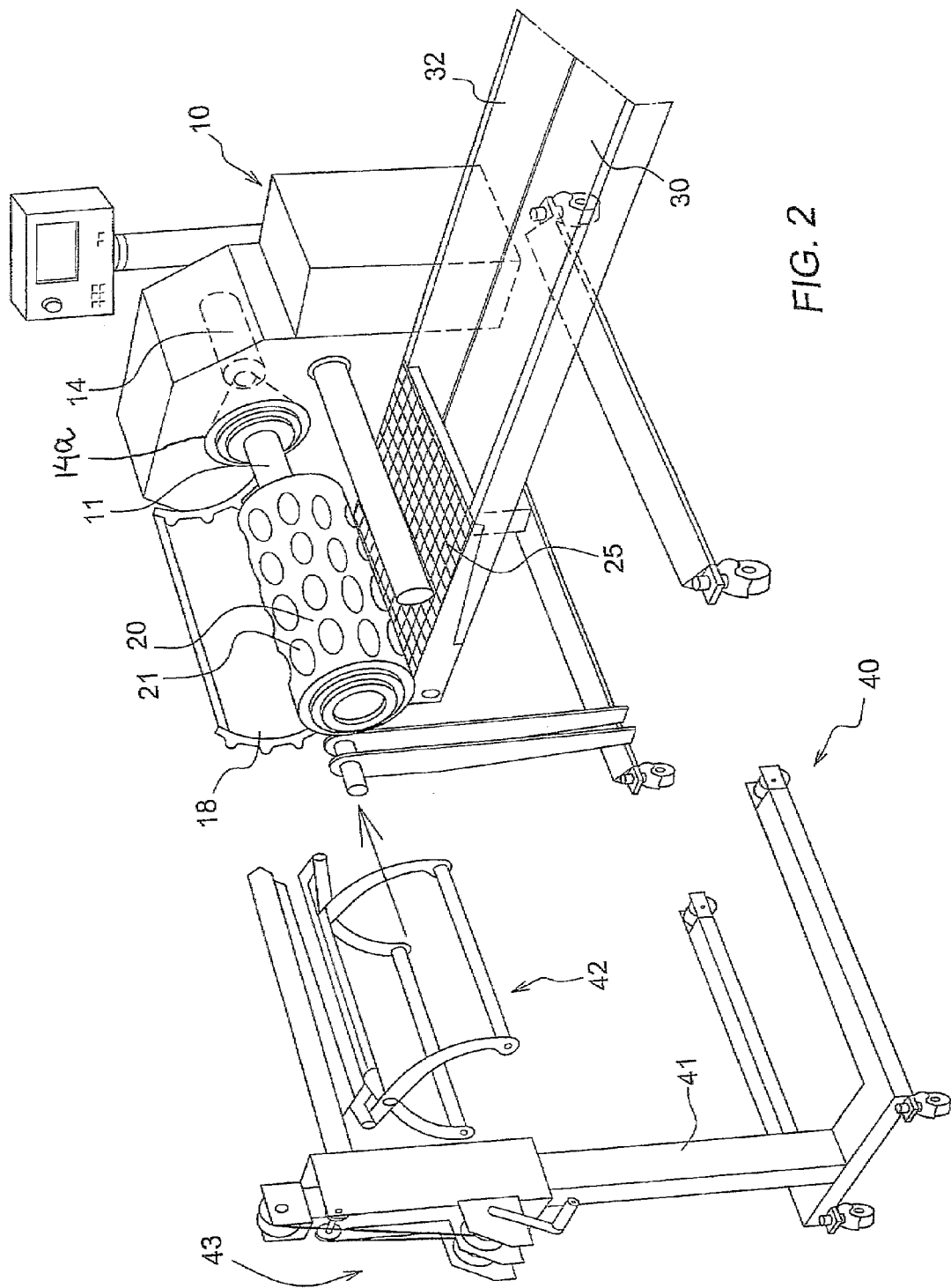
Figure 3:
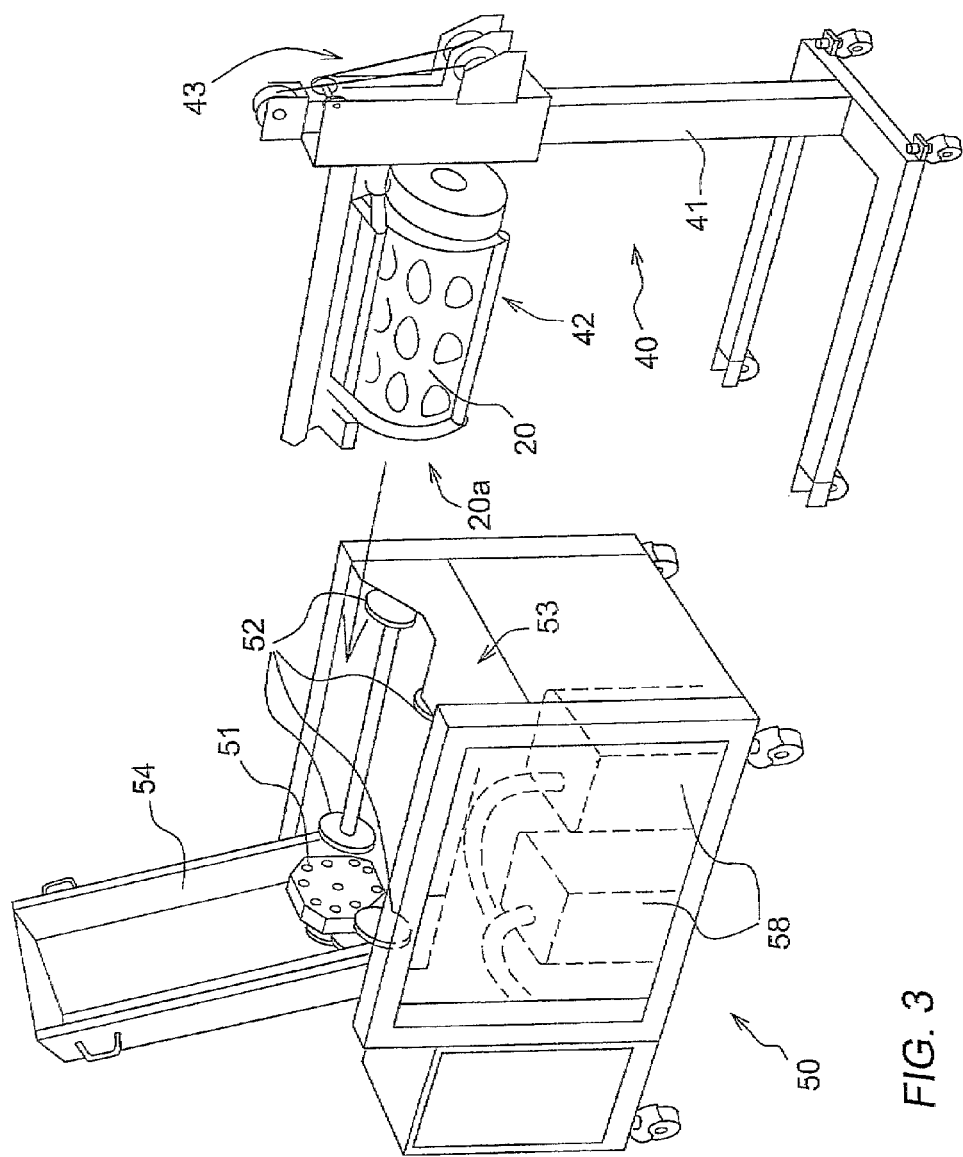
Figure 4:
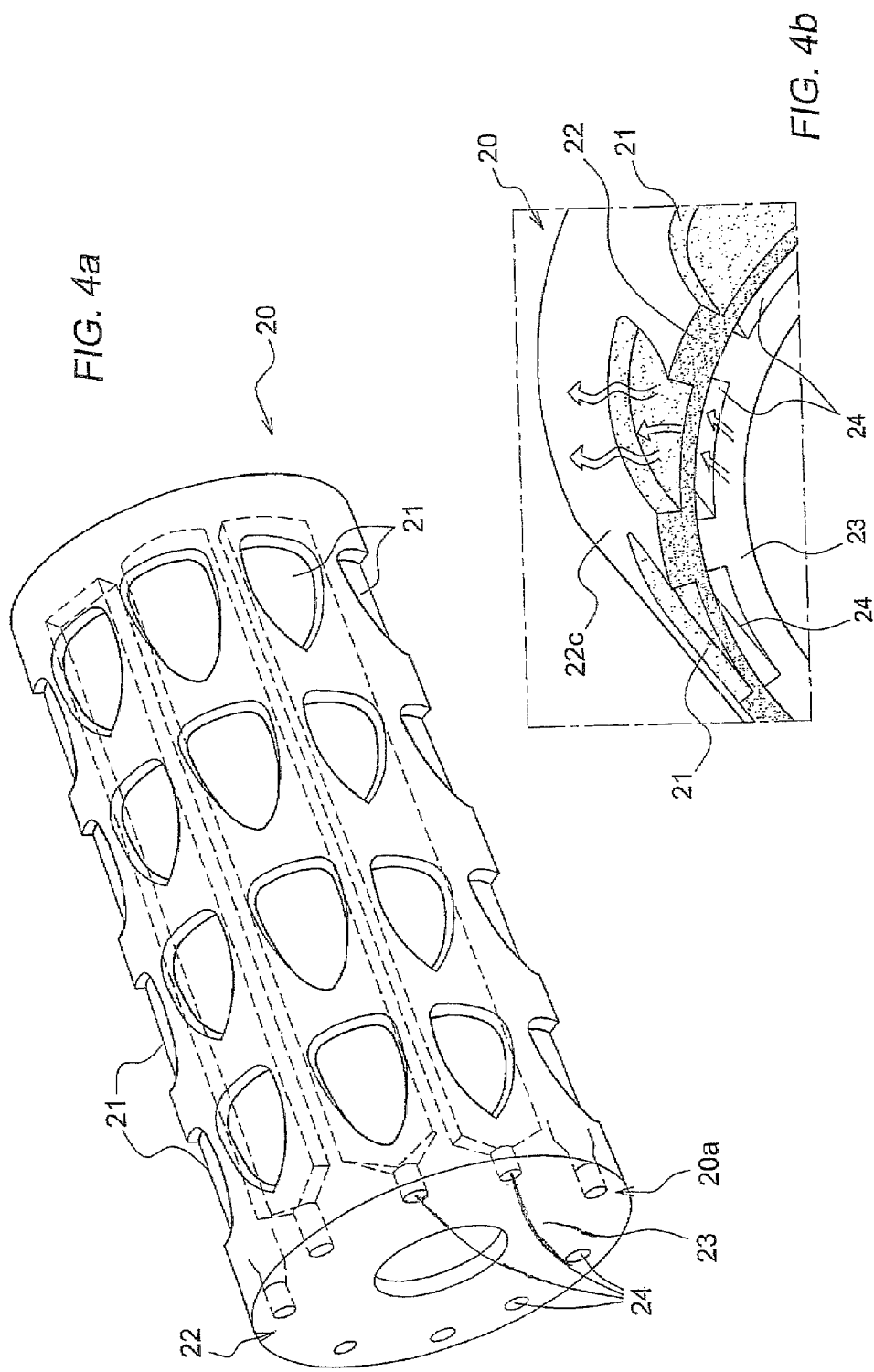
Figure 5:
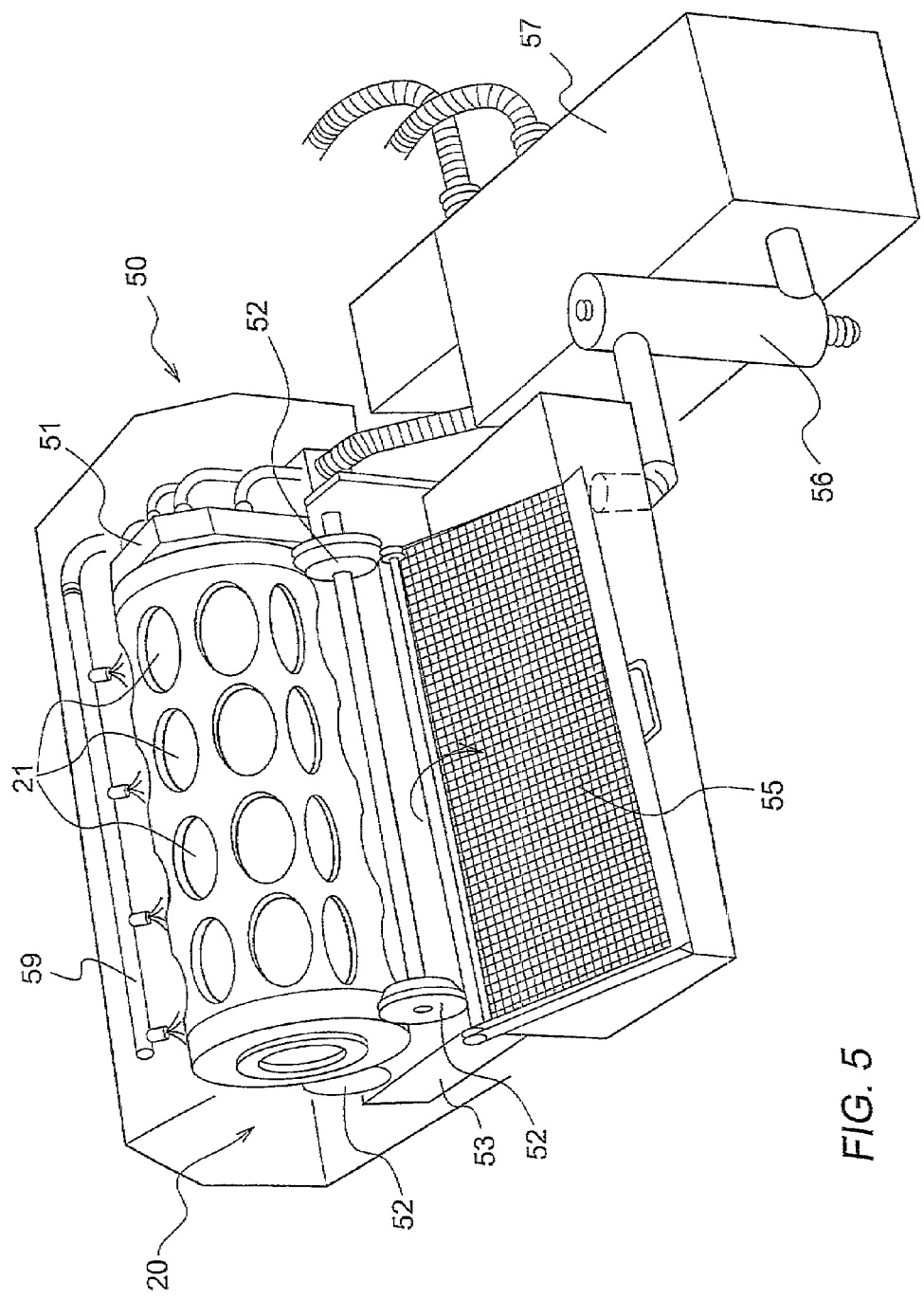
Figure 6:
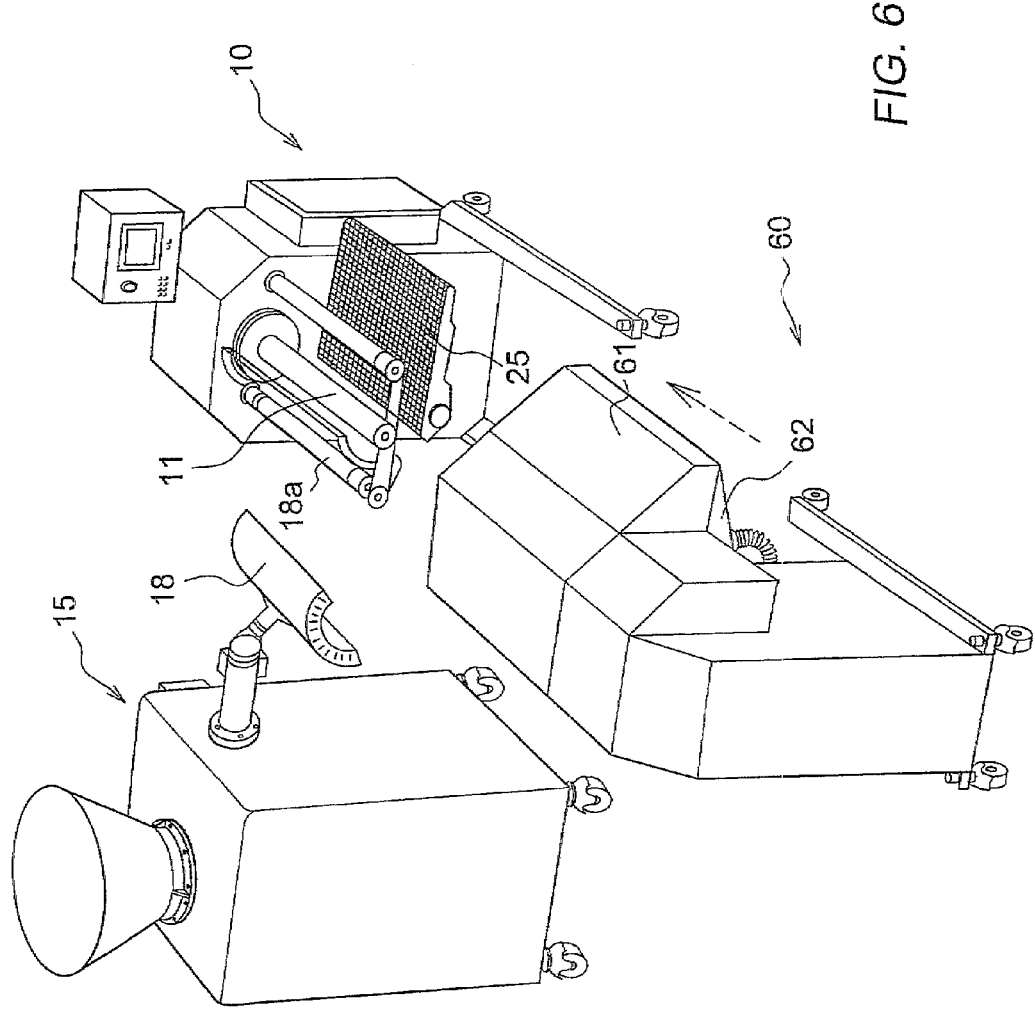
Figure 7:
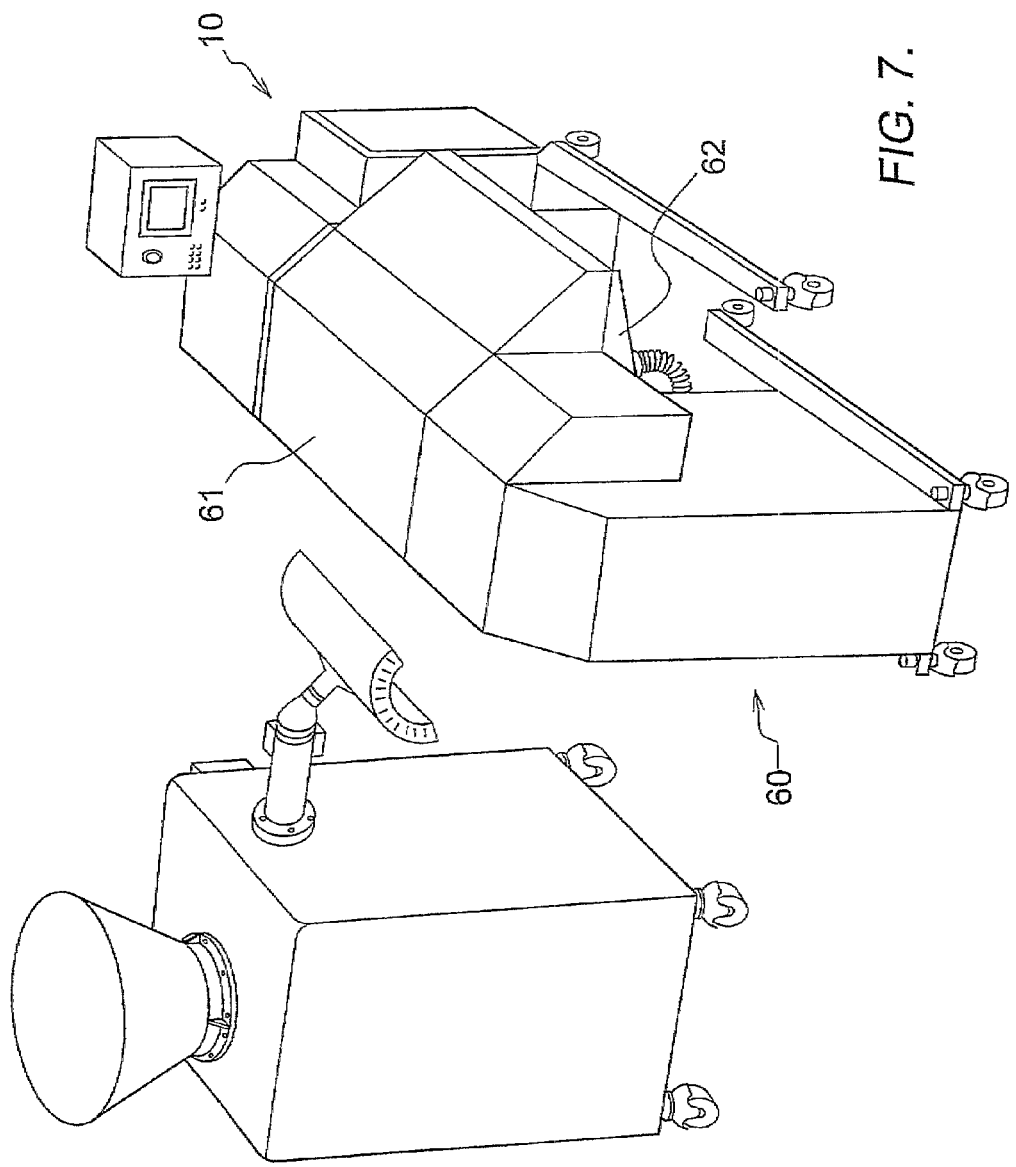
Figure 8:
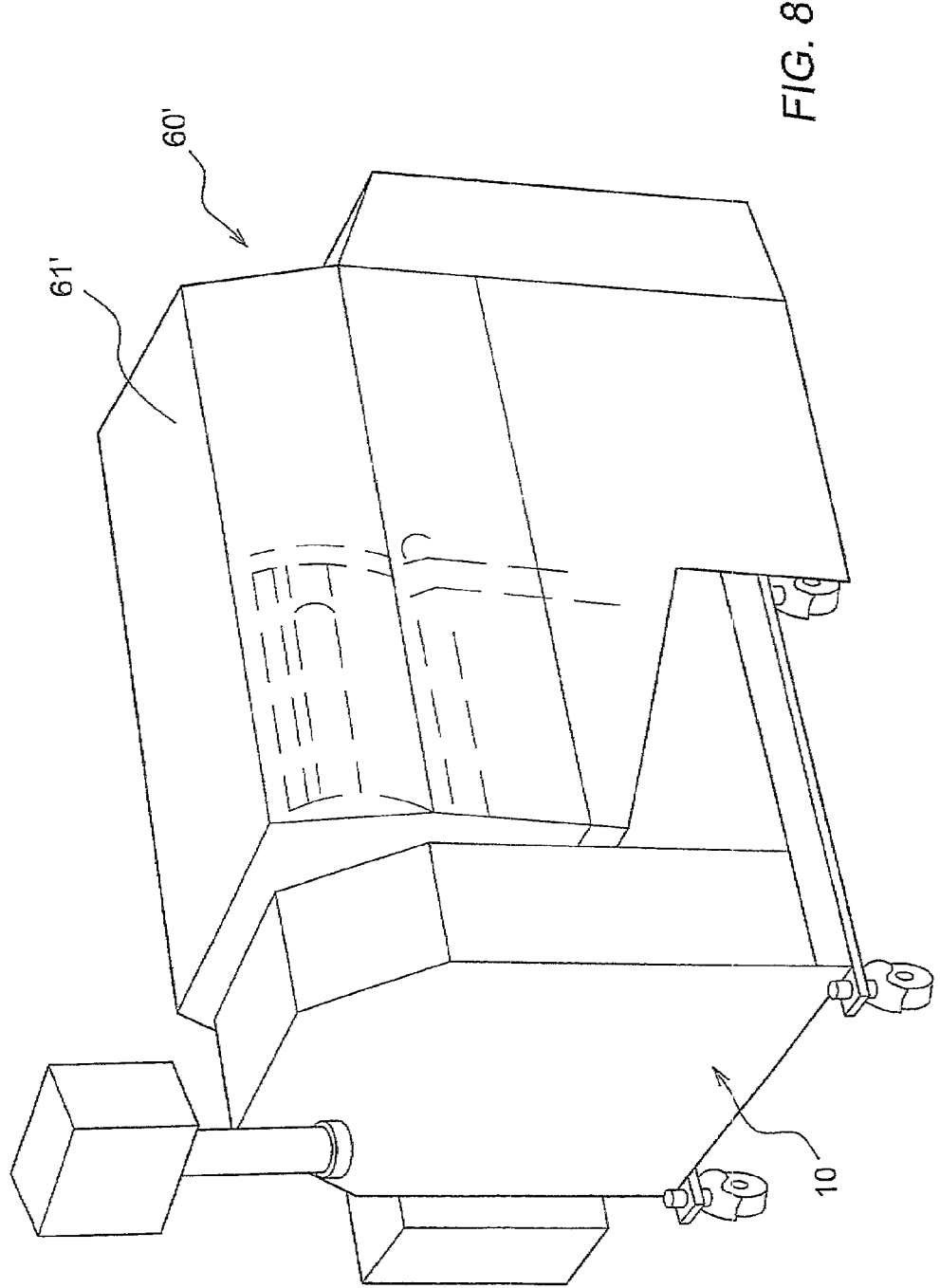
Figure 9:
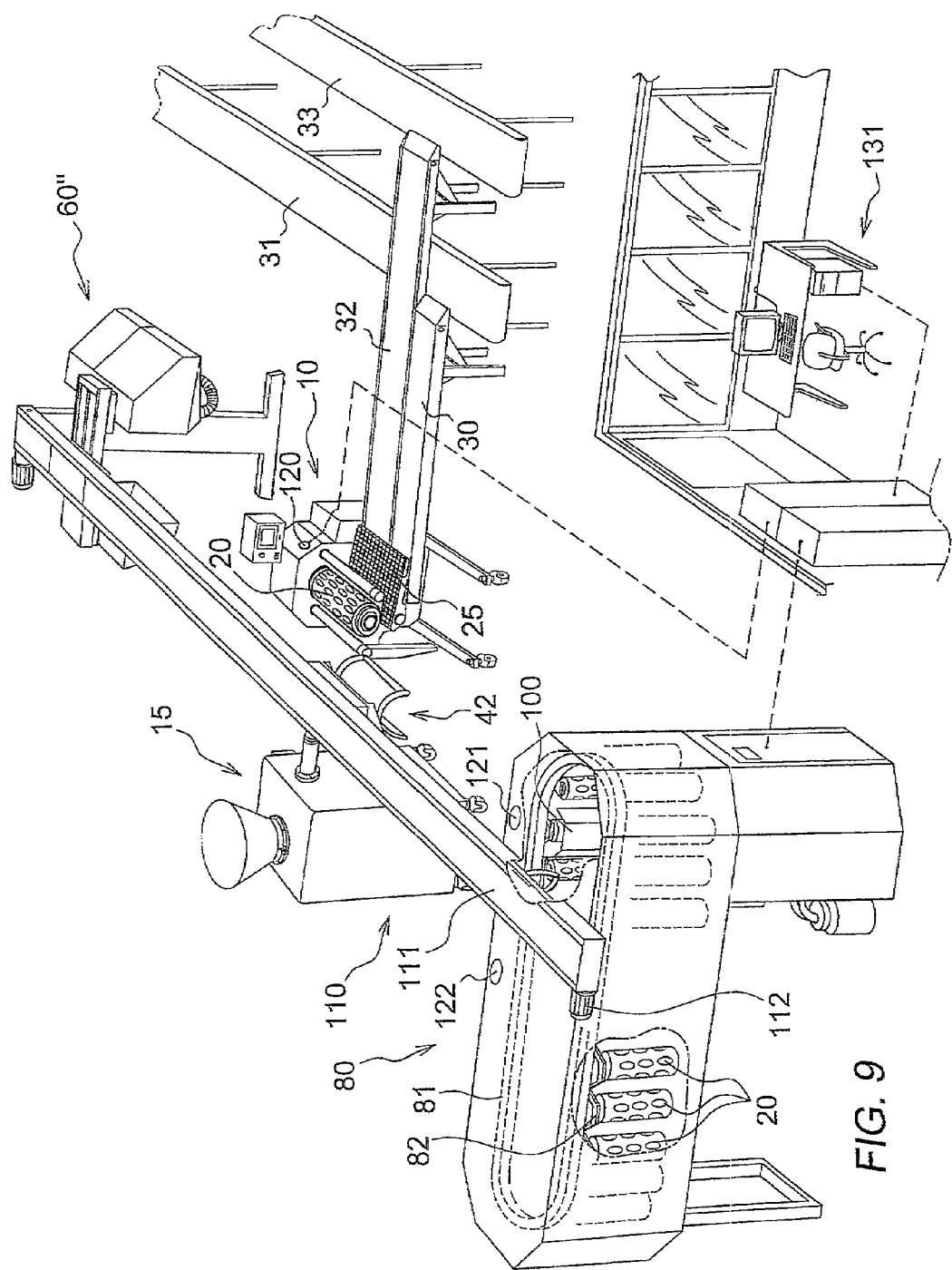
Figure 10:
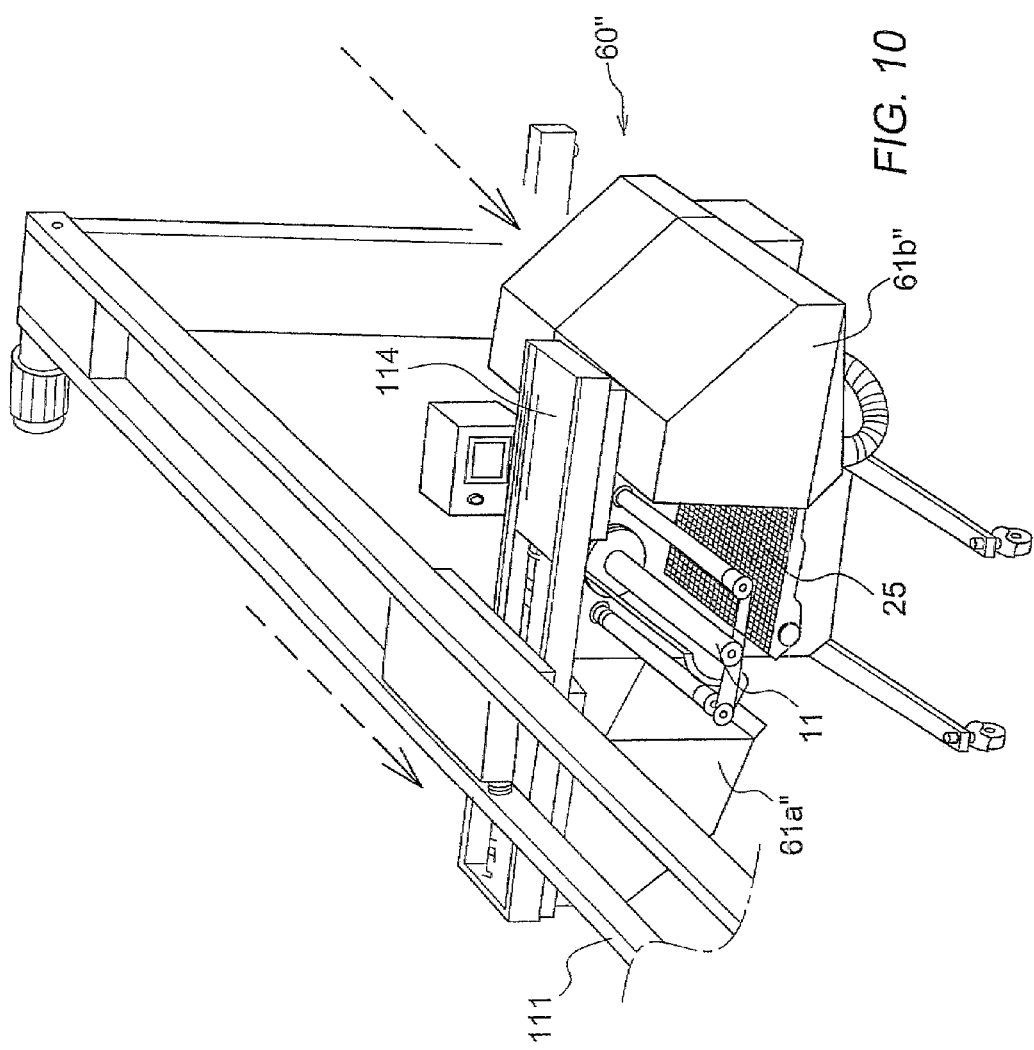
Figure 11:
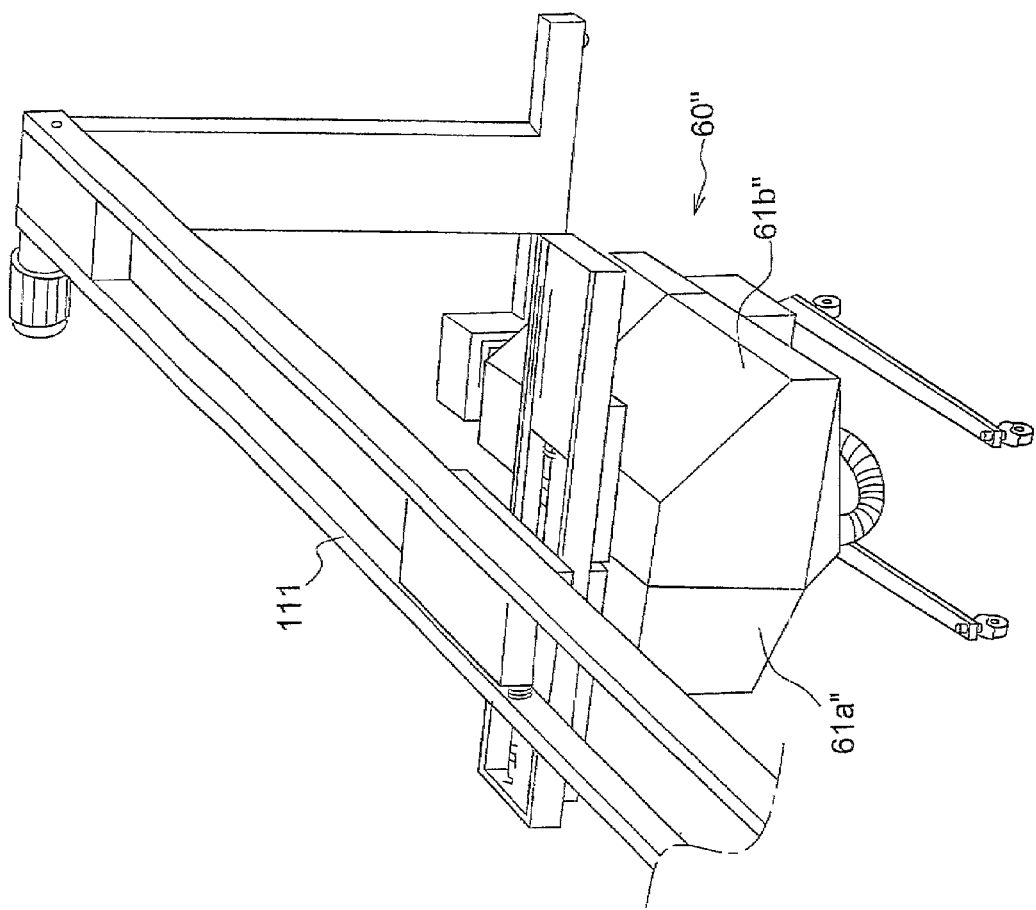
Figure 12:
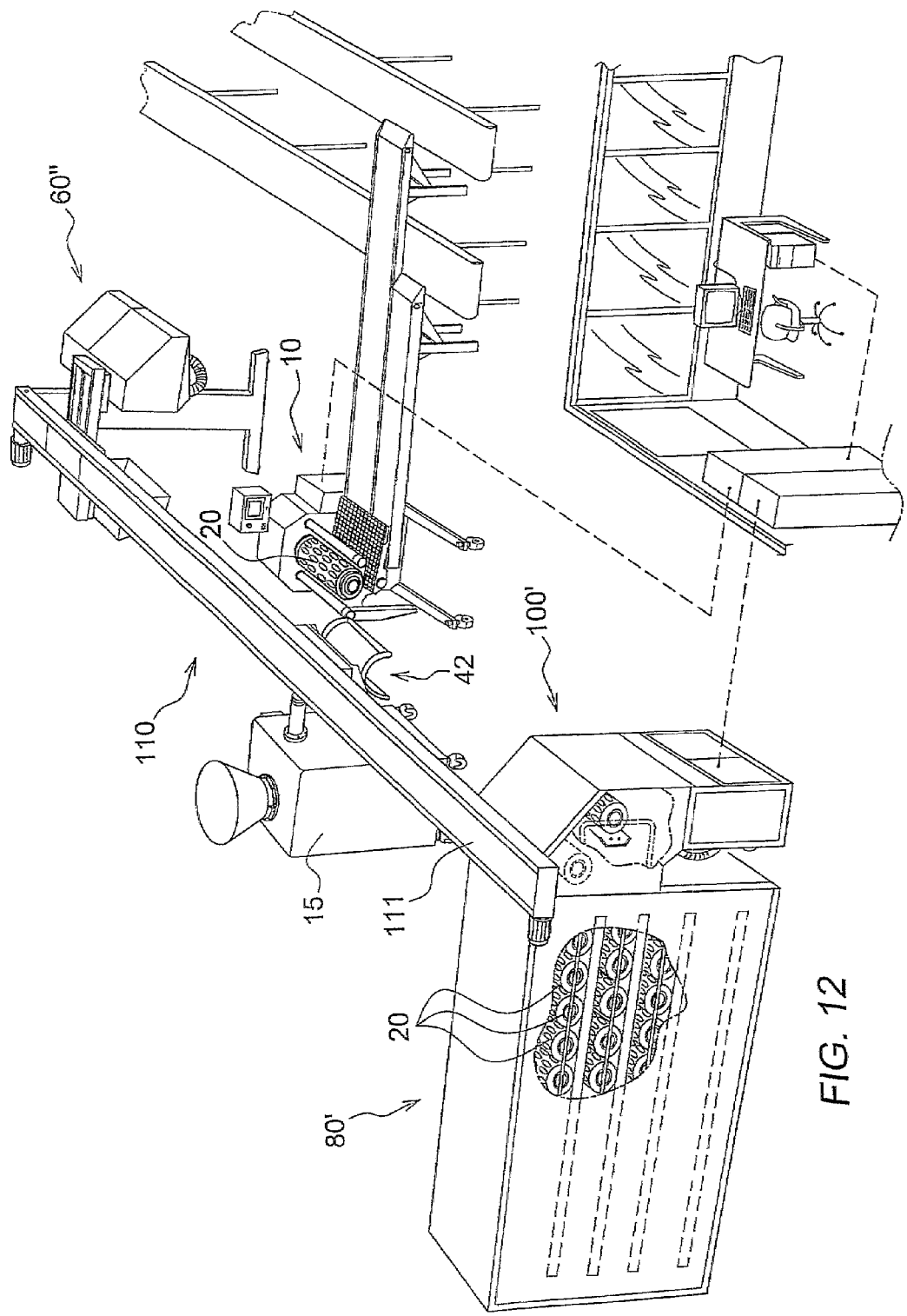
Figure 13:
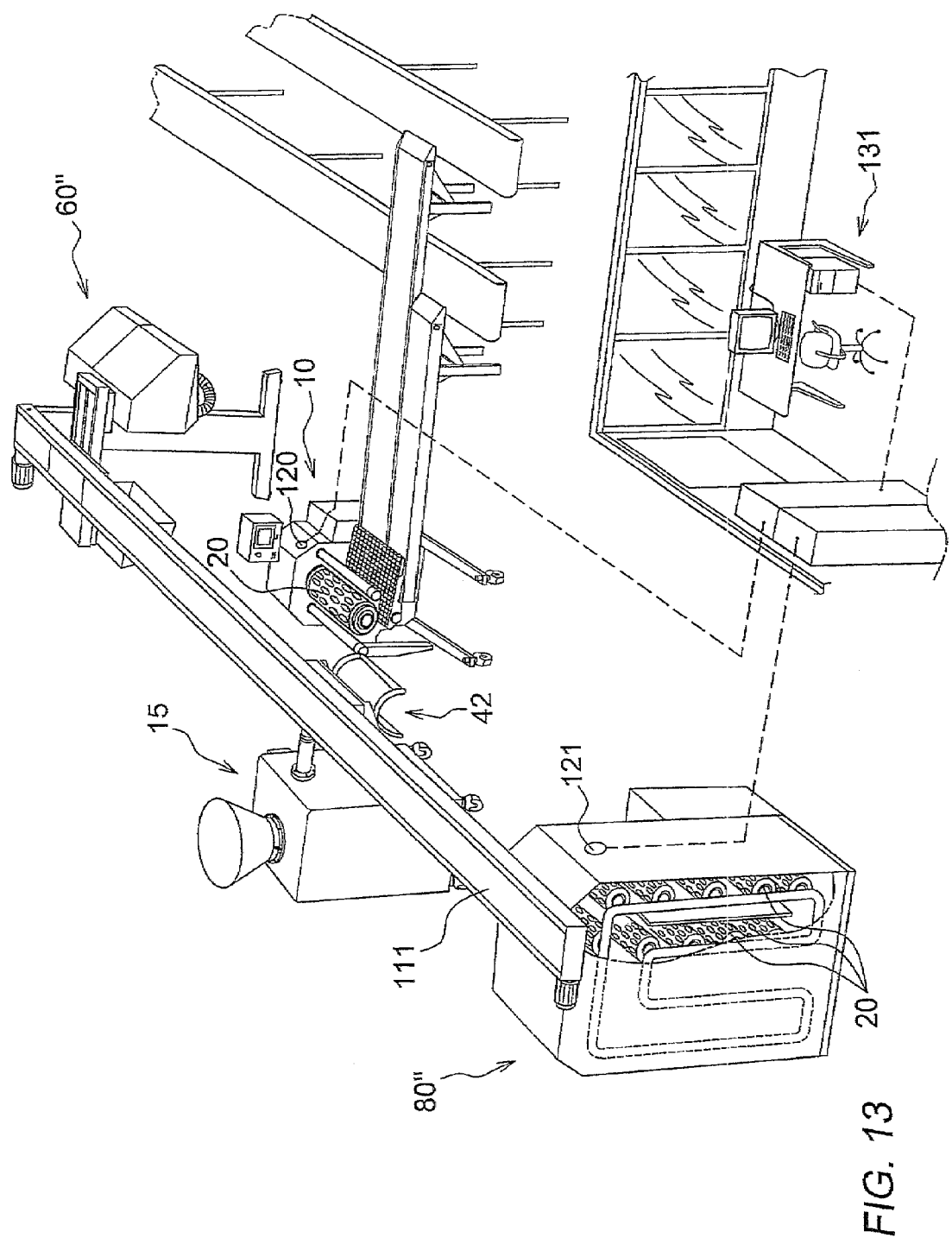

The various aspects of the invention will be explained in more detail below with reference to the drawing, in which:

FIG. 1 diagrammatically depicts an exemplary embodiment of a system according to the invention having a production device, mould drum cleaning device, cleaning device for the production device, FIG. 2 diagrammatically depicts a part of the production device with mould drum, and conveyor means for the mould drum from FIG. 1, FIG. 3 diagrammatically depicts the positioning of the mould drum in the mould drum cleaning device from FIG. 1, FIG. 4a shows a mould drum according to the invention, FIG. 4b shows a cross section through part of the mould drum from FIG. 4a, FIG. 5 diagrammatically depicts part of the mould drum cleaning device from FIG. 3, FIG. 6 diagrammatically depicts the production device and an associated cleaning device from FIG. 1, FIG. 7 shows the production device and the cleaning device which has been positioned against part of it, FIG. 8 diagrammatically depicts a variant of FIG. 7, FIG. 9 diagrammatically depicts a second exemplary embodiment of a system according to the invention, FIG. 10 shows the cleaning device which has been moved towards the production device and has its housing in the open position, FIG. 11 shows the illustration from FIG. 10 with the housing in the closed position, FIG. 12 diagrammatically depicts a third exemplary embodiment of a system according to the invention, and FIG. 13 diagrammatically depicts a fourth exemplary embodiment of a system according to the invention.

In the figures, reference numeral 1 denotes a production device which is designed to mould three-dimensional products from a mass of one or more food starting materials which are suitable for consumption, in particular human consumption, in particular a meat-containing mass.

The production device 1 is described in detail in WO 2004/002229, the contents of which are hereby deemed to be incorporated in the present application.

The production device 1 has a mould drum 20, as will be explained in more detail below. The production device 1 is only an example aimed at explaining the invention. The invention can also be realized using production devices of different designs, for example as shown in WO 00/30458.

By way of example, the invention can be used on production devices in which the mould member comprises a mould plate which is movable, for example can slide to and fro, which mould plate is provided with one or more mould cavities, which mould cavities each have an opening in at least one plate surface, the mass feed means comprising one or more mass feed members arranged along a plate surface. A production device of this type is often also used for the moulding of meat products, such as for example hamburgers. A device of this type is shown, for example, in U.S. Pat. No. 4,975,039.

The production device 1 has a mould drum part 10 with a frame, in this case a frame which can be moved over the floor and supports a mould member designed as a mould drum 20. The mould drum 20 has a drum surface at the outer circumference which is provided with a plurality of mould cavities 21.

The frame 10 is provided with a horizontal mould drum fitting spindle 11, so that the mould drum 20 is rotatable with respect to the frame 10 about the spindle 11.

In an embodiment which is not shown, the frame may have a plurality of mould drum fitting spindles, or the frame comprises other support means for supporting the mould drum rotatably with respect to the frame.

At one end, the fitting spindle 11 is fixed to the frame 10, so that the mould drum 20 can be pushed onto the fitting spindle 11 and removed from the free end.

Furthermore, the frame 10 is provided with mould drum drive means 14 for rotating the mould drum 20. In the embodiment shown, a statically disposed distributor 14a, suitable for supplying or sucking out a liquid or gaseous forcing agent, such as air, compressed air, water or steam or the like, is arranged in the vicinity of the mould drum drive means 14. A distributor which is known per se is provided with a pump and slots through which the forcing agent can flow. On account of the distributor 14a being disposed in a static position, the rotating mould drum alternately moves past forcing agent feed slots and forcing agent discharge slots.

Furthermore, the production device 1 has a mass feed part 15, which is likewise designed such that it can be moved over the floor and is provided with a storage container 16 for mass, in this example a (kneaded) meat mass, pump means 17 (illustrated highly diagrammatically) for pumping the mass, and a mass feed member 18 connected to the pump means 17. At a mass feed position, the mass feed member 18 bears against the outer circumference of the mould drum 20, so that (meat) mass can be fed to the passing mould cavities 21 of the rotating mould drum 20 under a filling pressure.

In this example, the mass feed member 18 is supported pivotably by means of a support spindle 18a on the frame 10.

Here, the frame 10 is also provided with a discharge member 25 for discharging the moulded products, in this case in the form of a (mesh) belt conveyor 25 which extends as far as beneath the mould drum 2, so that products which have been ejected from the mould cavities 21 in the region of the underside of the belt pass onto the said belt conveyor 25.

The system comprises further product conveyor means, in this case two sets of belt conveyors 30, 31 and 32, 33, for discharging moulded products, if appropriate to further product treatment devices.

As has been stated, the mould drum 20 is removable. For this purpose, in FIGS. 1-3 a mould drum conveyor 40 is provided. This conveyor 40, shown by way of example, has a movable frame 41, a mould drum gripper 42 and lifting means 43 for moving the gripper 42 up and down.

It can be seen from FIG. 2 that after the mass feed member 18 has been moved away from the mould drum 20, the conveyor 40 can be moved towards the frame 10, so that the gripper 42 can handle the mould drum 20. Then, the gripper 42 is moved to the correct height, so that it bears the weight of the mould drum 20 and the mould drum 20 is slid off the spindle 11. Then, the mould drum 20 can be displaced to a mould drum cleaning device 50, which is disposed at a distance from the production device 1. It should be noted that there is no need to provide a fixed arrangement, but rather, as can be seen, the device 50 is likewise of movable design. However, it is preferable for the cleaning work to be carried out at a different location from the production of foodstuffs.

The design of the cleaning device 50 and the cleaning of the mould drum 20 will now be explained in more detail with reference to FIGS. 3-5; in this context, it should be noted that this is an example of the invention.

As is diagrammatically depicted in FIG. 3 by the arrow, the mould drum 20 is placed in the cleaning device 50 with the aid of conveyor 40. The cleaning device 50 is in this case designed to carry out a plurality of possible cleaning processes substantially automatically, for example a primary cleaning process (which could be of relatively short duration) and an intensive cleaning process (for example in order to realize complete disinfection).

It can be seen from FIGS. 4a, b that the mould drum 20 is provided with mould cavities 21 each having a mould cavity wall, which is formed at least in part by a wall part with a porous structure.

In the preferred embodiment of the mould drum 20 shown, there is an outer drum 22, which is made at least in part (and in this example completely) from material with a porous structure, in such a manner that a mould cavity 21 has a mould cavity wall which is at least partially porous.

Inside the outer drum 22 there is positioned an inner member 23 which fits into the outer drum 22, the inner member 23, together with the adjoining surface of the outer drum 22, forming a number of passages 24 which extend from one head end 20a of the mould drum 20, so that a medium can be forced through the porous walls of the mould cavities 21 and/or suction can take place via a passage 24 of this type. The said medium, for example compressed air, can be used, for example, to release the moulded product from a mould cavity 21. The suction can be used to extract air during the filling operation and/or, for example, to suck a film or the like into the mould cavity.

In a variant which is not shown, the passages 24, if appropriate branching into passages of smaller diameter, continue as far as the mould cavity, in which case the porous wall, for example made from sintered metal, is then absent.

It can be seen from FIG. 4b that the outer surface of the inner member 23 is provided with grooves which extend substantially in the axial direction and form the passages 24.

The outer drum 22 could, for example, be assembled from one or more rings of porous material, for example porous metal, in which case the one or more mould cavities 21 are formed by a material-removing machining operation, for example an electro-erosive machining operation.

If appropriate, the mould drum may comprise rings, optionally provided with mould cavities, which are releasably coupled to one another, so that a set of rings is obtained as seen in the axial direction of the mould drum. This can serve to influence the capacity of the moulding device, for example by combining rings with and without mould cavities and/or rings with different numbers and/or shapes of the mould cavities. It should be noted that when the mould member is designed as a mould plate. it is also possible to make use of an assembly of parts which forms the final mould plate.

If the outer drum 22 is made from metal, the porous structure can be sealed in the outermost part 22c of the surface of the outer drum by a lubricating action during the machining of the metal porous drum 20 in a lathe. Obviously, the sealing of the said outermost part 22c could also be realized in other ways, for example by the application of a coating layer (which if appropriate partially penetrates into the porous material).

In an embodiment which is not shown, the mould drum only comprises an "outer" wall, for example such as the component 22 shown in FIG. 4b. The frame may then, for example, comprise passages via which a medium (air) can be displaced to or from the mould cavities in the mould drum. By way of example, it is possible to provide for the fitting spindle to be provided with passages, such as for example the passages 24. In a variant, the frame comprises the inner member 23 (optionally releasable), and the mould drum is formed by component 22, which can be removed from the inner member 23. As will subsequently be demonstrated, it would then be possible, for example, for only the "outer drum" 22 to be placed in the cleaning device 50, and for a storage device for outer drums 22 to be provided.

It would also be possible to provide for the mould drum to be supported by supporting features at both head-ends of the mould drum.

The cleaning device 50 is designed to force at least one cleaning liquid through the wall parts with the porous structure into the mould cavities 21. As can be seen in FIG. 4a, the passages 24 leading to each mould cavity 21 each have a feed opening 24a in an end face 20a of the mould drum 20.

The cleaning device 50 has a distributor 51 which comes to bear against the head-end face 20a, for the purpose of feeding cleaning liquid to one or more of the passages 24. In this way, any possible contamination which has stuck to or in the porous wall part of a mould cavity 21 is forced out and discharged. As seen in FIG. 4b, cleaning solution travels through the passage 24 inside the mould drum and is forced to the outside of the mould drum through the porous wall of the cavity. The path of the cleaning liquid is depicted by arrows in FIG. 4b. When passing though from the inside of the mould drum to the outside of the mould drum, the cleaning solution is able to remove possible contamination from the mould cavities.

The cleaning device 50 is provided with supporting means 52 for rotatably supporting the mould drum 20 that is to be cleaned, in this case rollers 52 which bear against the outer circumference of the drum and, via a motor (not shown), serve as drive means for driving the mould drum 20 to be cleaned in rotation. In an embodiment which is not shown, the mould drum to be cleaned can be driven by a central shaft.

The cleaning device 50 has a collection trough 53 for cleaning liquid and a cover 54, so that the cleaning of the mould drum 20 can take place in a closed chamber.

The cleaning device 50 is designed to collect and at least partially recirculate cleaning liquid, for which purpose a pump 57 is provided. The cleaning device 50 is provided with a filter for filtering the cleaning liquid, for example a coarse filter 55 and a fine filter 56.

It is preferable to provide heating means for heating the cleaning liquid. Furthermore, there are means for mixing one or more chemicals with a cleaning liquid, for example a disinfectant, stored, for example, in containers 58.

Spraying means 59 are provided here for an initial coarse cleaning.

In one possible cleaning process, first of all the outer side of the drum is rinsed by the sprayers 59, followed by rinsing with cold water (together with a suitable cleaning agent) via the passages 24, followed by disinfection with water provided with suitable chemicals and a final rinse via the passages and on the outside with cold water. As an alternative, one or more steps could also be carried out using hot water (40-90 degrees Celsius).

The cleaning could also comprise descaling of the mould member, for example using a suitable acid, which may be of relevance in particular to mould cavities with a porous wall structure.

In an embodiment which is not shown, the cleaning device comprises inspection means. These inspection means, for example having a digital (infrared) camera with associated image-processing means, can monitor the cleaning and also the state of the mould drum. By way of example, it is possible to detect damage and/or wear to the drum. These inspection results can be stored in a memory and if appropriate interpreted in combination with the use/cleaning history, for example in order to determine the expected service life.

Furthermore, the system comprises a second cleaning device 60, which is designed to clean that part of the production device 1 which bears the mould drum 20, in particular after the said mould drum 20 has been removed. That part of the device 10, after all, also becomes soiled during production.

As can be seen from FIGS. 1 and 6, in this example the cleaning device 60 is of movable design, in such a manner that the cleaning device 60 can be placed against that part of the production device 1 which is to be cleaned.

The cleaning device 60 comprises a housing 61, which can form a closed chamber around that part of the production device that is to be cleaned, in order for a cleaning process to be carried out in the said closed chamber.

In this example, the said housing 61—when it is bearing against a corresponding part of component 10 (cf. FIG. 7)—surrounds the fitting spindle 11 for the drum and the discharge belt 25 as well as the support spindle 18a. In this case, the underside of the housing 61 forms a collection trough 62 for cleaning liquid (that is to be recirculated). One or more sprayers or other similar devices which spray out optionally heated cleaning liquid may be provided in the cleaning device 60. The device 60 may likewise be provided with one or more filters, additions of chemicals, etc. It is preferable for the cleaning device also to be able to carry out a number of possible cleaning processes as desired. It is preferable for this cleaning device likewise to comprise inspection means (not shown) for inspecting the production device, so that the cleaning and the state of the device can be monitored.

FIG. 8 shows a variant of the cleaning device 60, which device 60' is arranged in a fixed position, so that that part 10 of the production device 1 which is to be cleaned is moved to the cleaning device 60'. In this case too, a housing 61' forms a protected chamber around the components to be cleaned.

FIG. 9 shows a system in which there is a storage device 80 for storing a plurality of mould members, in this example mould drums 20. The storage device 80 forms a storage chamber which is substantially closed off with respect to the outside for storing the mould members, for example the mould drums 20. The storage device 80 comprises associated conveyor means for displacing the mould members 20 between a receiving and/or release position and one or more storage positions.

In this example, the storage device 80 is combined with a mould drum cleaning device 100.

The storage device 80 is located at a distance from the production device 1, and there are conveyor means 110 for conveying the mould drums 20 between the storage device 80 and the production device 1.

These conveyor means 110 in this case comprise an overhead conveyor 111, along which the gripper 42 for a mould drum 20 can be displaced. A drive motor 112 is provided for this purpose. The gripper 42 can remove a mould drum 20 from the device 1 and move it towards the storage device 80, where the mould drum 20 is transferred by internal conveyor means associated with the storage device. In this example, the storage device 80 is provided with an endless suspended track 81 with carriers 82 which can be displaced along the said track 81 and can each carry a drum 20. The cleaning device 100 is located along the track 81, for example at the location where the mould drums 20 first reach the storage device 80 after use.

It can be seen from FIG. 9 that the cleaning device 60" for the production device 1 likewise has associated conveyor means, which in this case are designed as an extension of the overhead conveyor 111. This conveyor 11 can move the cleaning device 60" between an inactive position at a distance from the production device 1 (cf. FIG. 9) and an active position at the production device (cf. FIGS. 10 and 11).

The cleaning device 60" has two housing parts 61a" and 61b", which can move with respect to one another between an open position (FIG. 10) and a closed position (FIG. 11). In the open position, the cleaning device 60" can be fitted to that part 10 of the production device 1 which is to be cleaned, and then the parts to be cleaned (spindle 11, conveyor belt 25) can be enclosed and a cleaning treatment carried out.

In this example, the housing parts 61a" and 61b" can be displaced along a guide 114 which is located at the top side of the housing parts. The guide 114 can in turn be displaced along the conveyor 111.

FIG. 12 shows a system which largely corresponds to the system shown in FIGS. 9-11. In FIG. 12, there is a mould drum storage device 80' where mould drums 20 lie in racks or the like. A conveyor means (not shown) of the storage device is responsible for putting in and removing mould drums 20. Furthermore, there is a cleaning device 100' combined with the storage device 80". As can be seen, the gripper 42 first releases the mould drum 20 at this cleaning device 100'.

FIG. 13 shows a system which largely corresponds to the systems shown in FIGS. 9-12. The storage device 80" has a paternoster for the mould drums 20.

For expedient production of three-dimensional food products by means of a system which uses exchangeable mould members, such as the mould drums which have been explained with reference to the drawing, it is preferable to provide for each removable mould member, in the examples mould drum 20, to be provided with an identification.

By way of example, each mould drum 20 is provided with an optically readable code (such as a barcode), an electronic transponder (which can be read and if appropriate written remotely), or other identification characteristic. The said characteristic is preferably unique to each mould member.

The system is in this case provided with suitable recognition or reading means for recognizing the identification of a mould member. If appropriate, it is also possible to provide writing means for adapting the identification characteristic, for example when using a writable transponder.

FIG. 1 indicates that the part 10 of the production device 1 is provided with recognition means for, preferably automatically, recognizing the identification of a mould drum 20, for example a reader 120 for a transponder which is arranged at a suitable location, for example at an head-end face, on the mould drum 20.

This reader 120 is connected to a control device 130 of the system, which in this case has an associated computer 131. A history of the use of the mould drum 20 is stored for each mould drum 20 in the memory of the computer 131. Partially on this basis, it is possible to determine the instant at which a mould drum 20 has to be cleaned, and if appropriate by what cleaning process. For example, the cleaning process can be matched to the type of mould drum, and the way in which each mould drum is cleaned can be determined separately.

The history can define the use of the mould drum 20, for example in conjunction with the identification provided to the products ultimately produced, which is useful, for example, in the context of product safety (for example if products need to be recalled).

In one variant, the mould member cleaning device is (also) provided with recognition means for recognizing the identification of a mould member, such as reader 121 in FIG. 9.

In FIG. 9, a further reader 122 serves as a recognition means for the mould drums 20 for correct operation of the storage device 80.

It is preferable, therefore, to provide storage for the history of a mould member, in which context the cleaning of the mould member is also stored. It is preferable for at least the times and the associated designation of the cleaning processes carried out to be stored.

The identification of mould members 20 allows optimum efficiency of the system to be achieved, in which context the correct cleaning of the mould members 20 can be ensured and documented. Furthermore, the cleaning of component 10 using cleaning device 60 can also be stored, so that a complete picture of the cleaning of the parts of the system which may become contaminated is obtained.

The use of, preferably automated, storage and conveyor means for the mould members allows their quality to be ensured and a high production rate to be achieved. Moreover, a change of mould members, for example when switching to a different shape of product, can be carried out quickly and with little operator intervention.

The invention claimed is:

1. A system for moulding three-dimensional products from a mass of one or more food starting materials which are suitable for animal or human consumption, which system comprises:
 a production device having:
  a frame;
  a mould drum provided with one or more mould cavities, the mould drum being rotatably supported with respect to the frame about an associated axis of rotation, each of the one or more cavities having an opening in at least one drum surface, an outer portion of the mould drum comprising a porous material, such that a mould cavity wall is at least partially porous, an inner member of the mould drum being adapted to fit into the outer portion of the mould drum, and forming, together with an adjoining surface of the outer portion of the mould drum, one or more passages which extend from one head-end of the mould drum, to permit a medium to be forced through the porous mould cavity wall and/or suction to take place via at least one said passage; and
  a mass feed device for feeding the mass to the one or more mould cavities of the mould drum, wherein the mass feed device comprises one or more mass feed members disposed along the at least one drum surface; and
 a mould drum cleaning device for forcing at least one cleaning liquid from an inside of the mould drum to an outside of the mould drum, the at least one cleaning liquid passing through at least one passage leading to the at least partially porous mould cavity wall into the one or more mould cavities,
 wherein the mould drum cleaning device comprises:
  a support for rotatably supporting the mould drum that is to be cleaned;
  a drive for driving the mould drum to be cleaned in rotation; and
  a housing to form a closed chamber in which cleaning can take place.

2. The system according to claim 1, wherein the mould drum is adapted to be removable from the frame, and wherein the mould drum cleaning device is adapted to clean the mould drum, the mould drum cleaning device is adapted to be located at a distance from the production device, and further comprising a conveyor device for moving the mould drum between the production device and the mould drum cleaning device.

3. The system according to claim 1, wherein the production device is provided with a drive for the mould drum, the frame defines a substantially horizontal axis of rotation for the mould drum, and the frame comprises a fitting spindle which at one end is fixed to the frame, to permit the mould drum to be slid onto the fitting spindle.

4. The system according to claim 1, wherein the mould drum is adapted to be removable from the frame, and further comprising a production device cleaning device which is adapted to clean one or more parts of the production device after removal of the mould drum.

5. The system according to claim 1, wherein the mould drum is provided with an identification element and the system comprises a recognition device configured to recognize the identification element of the mould drum.

6. The system for moulding three-dimensional products according to claim 1, wherein the mould drum cleaning device is adapted to treat the mould drum with at least one cleaning liquid, and comprises a collection trough for cleaning liquid and a cover, to permit cleaning of the mould drum in a closed chamber.

7. A system for moulding three-dimensional products from a mass of one or more food starting materials which are suitable for animal or human consumption, which system comprises:
   a production device having:
      a frame;
      a mould member provided with at least one mould cavity, an outer portion of the mould member comprising a porous material, such that a mould cavity wall is at least partially porous, the frame supporting the mould member; and
      a mass feed device for feeding the mass to the at least one mould cavity of the mould member; and
   a mould drum cleaning device for forcing at least one cleaning liquid from an inside of the mould drum to an outside of the mould drum, the at least one cleaning liquid passing through at least one passage leading to the at least partially porous mould cavity wall into the at least one mould cavity, and comprises:
      a collection trough for cleaning liquid;
      a cover, to permit cleaning of the mould member in a closed chamber;
      a pump to at least partially recirculate cleaning liquid; and
      a filter for filtering the cleaning liquid.

8. A system for moulding three-dimensional products from a mass of one or more food starting materials which are suitable for animal or human consumption, which system comprises:
   a production device having:
      a frame;
      a mould member provided with at least one mould cavity, the frame supporting the mould member, an outer portion of the mould member comprising a porous material, such that a mould cavity wall is at least partially porous; and
      a mass feed device for feeding the mass to the at least one mould cavity of the mould member; and
   a mould drum cleaning device for forcing at least one cleaning liquid from an inside of the mould drum to an outside of the mould drum, the at least one cleaning liquid passing through at least one passage leading to the at least partially porous mould cavity wall into the at least one mould cavity, and comprises a heater for heating the cleaning liquid.

9. A system for moulding three-dimensional products from a mass of one or more food starting materials which are suitable for animal or human consumption, which system comprises:
   a production device having:
      a frame;
      a mould member provided with at least one mould cavity, the frame supporting the mould member; and
      a mass feed device for feeding the mass to the at least one mould cavity of the mould member; and
   at least one cleaning device for cleaning one or more parts of the production device which come into contact with the mass, wherein the at least one cleaning device comprises an inspection device having a digital camera with an associated image-processor for monitoring the cleaning.

10. The system according to claim 1, wherein the mould drum cleaning device is adapted to carry out at least one cleaning process substantially automatically, and to carry out one of several possible cleaning processes.

11. The system according to claim 1, wherein the mould drum is adapted to be removable from the frame, and further comprising a storage device for storing a plurality of mould drums.

12. The system according to claim 1, wherein the mould drum is adapted to be removable from the frame, and further comprising a memory for storing at least one history of a mould drum.

13. A method for moulding three-dimensional products from a mass of one or more food starting materials which are suitable for animal or human consumption, wherein the one or more food starting materials includes a meat, comprising the step of using the system according to claim 1.

14. The system according to claim 7, wherein the mould member is adapted to be removable from the frame, and wherein the at least one cleaning device is a mould member cleaning device adapted to clean the mould member, the mould member cleaning device is adapted to be located at a distance from the production device, and further comprising a conveyor device for moving the mould member between the production device and the mould member cleaning device.

15. The system according to claim 7, wherein the mould member comprises a mould drum which is adapted to rotate with respect to the frame about an associated axis of rotation, the mould drum is provided with one or more mould cavities, each of which has an opening in at least one drum surface, the mass feed device comprises one or more mass feed elements disposed along a drum surface, the production device being provided with a drive for the mould drum, the frame defines a substantially horizontal axis of rotation for the mould drum, and the frame comprises a fitting spindle which at one end is fixed to the frame, to permit the mould drum to be slid onto the fitting spindle.

16. The system according to claim 7, wherein the mould member is adapted to be removable from the frame, and further comprising a production device cleaning device which is adapted to clean one or more parts of the production device after removal of the mould member.

17. The system according to claim 7, wherein the mould member is provided with an identification element and the system comprises a recognition device configured to recognize the identification element of the mould member.

18. The system according to claim 7, wherein the at least one cleaning device is adapted to treat the one or more parts that are to be cleaned with at least one cleaning liquid, and comprises a collection trough for cleaning liquid and a cover, to permit cleaning of the mould drum in a closed chamber.

19. The system according to claim 7, wherein the at least one cleaning device is adapted to carry out at least one cleaning process substantially automatically, and to carry out one of several possible cleaning processes.

20. The system according to claim 7, wherein the mould member is adapted to be removable from the frame, and further comprising a storage device for storing a plurality of mould members.

21. The system according to claim 7, wherein the mould member is adapted to be removable from the frame, and further comprising a memory for storing at least one history of a mould member.

22. The system according to claim 8, wherein the mould member is adapted to be removable from the frame, and wherein the at least one cleaning device is a mould member cleaning device adapted to clean the mould member, the mould member cleaning device is adapted to be located at a distance from the production device, and further comprising a conveyor device for moving the mould member between the production device and the mould member cleaning device.

23. The system according to claim 8, wherein the mould member comprises a mould drum which is adapted to rotate with respect to the frame about an associated axis of rotation, the mould drum is provided with one or more mould cavities, each of which has an opening in at least one drum surface, the mass feed device comprises one or more mass feed elements disposed along a drum surface, the production device being provided with a drive for the mould drum, the frame defines a substantially horizontal axis of rotation for the mould drum, and the frame comprises a fitting spindle which at one end is fixed to the frame, to permit the mould drum to be slid onto the fitting spindle.

24. The system according to claim 8, wherein the mould member is adapted to be removable from the frame, and further comprising a production device cleaning device which is adapted to clean one or more parts of the production device after removal of the mould member.

25. The system according to claim 8, wherein the mould member is provided with an identification element and the system comprises a recognition device configured to recognize the identification element of the mould member.

26. The system according to claim 8, wherein the at least one cleaning device is adapted to treat the one or more parts that are to be cleaned with at least one cleaning liquid, and comprises a collection trough for cleaning liquid and a cover, to permit cleaning of the mould drum in a closed chamber.

27. The system according to claim 8, wherein the at least one cleaning device is adapted to carry out at least one cleaning process substantially automatically, and to carry out one of several possible cleaning processes.

28. The system according to claim 8, wherein the mould member is adapted to be removable from the frame, and further comprising a storage device for storing a plurality of mould members.

29. The system according to claim 8, wherein the mould member is adapted to be removable from the frame, and further comprising a memory for storing at least one history of a mould member.

30. The system according to claim 9, wherein the mould member is adapted to be removable from the frame, and wherein the at least one cleaning device is a mould member cleaning device adapted to clean the mould member, the mould member cleaning device is adapted to be located at a distance from the production device, and further comprising a conveyor device for moving the mould member between the production device and the mould member cleaning device.

31. The system according to claim 9, wherein the mould member comprises a mould drum which is adapted to rotate with respect to the frame about an associated axis of rotation, the mould drum is provided with one or more mould cavities, each of which has an opening in at least one drum surface, the mass feed device comprises one or more mass feed elements disposed along a drum surface, the production device being provided with a drive for the mould drum, the frame defines a substantially horizontal axis of rotation for the mould drum, and the frame comprises a fitting spindle which at one end is fixed to the frame, to permit the mould drum to be slid onto the fitting spindle.

32. The system according to claim 9, wherein the mould member is adapted to be removable from the frame, and further comprising a production device cleaning device which is adapted to clean one or more parts of the production device after removal of the mould member.

33. The system according to claim 9, wherein the mould member is provided with an identification element and the system comprises a recognition device configured to recognize the identification element of the mould member.

34. The system according to claim 9, wherein the at least one cleaning device is adapted to treat the one or more parts that are to be cleaned with at least one cleaning liquid, and comprises a collection trough for cleaning liquid and a cover, to permit cleaning of the mould drum in a closed chamber.

35. The system according to claim 9, wherein the at least one cleaning device is adapted to carry out at least one cleaning process substantially automatically, and to carry out one of several possible cleaning processes.

36. The system according to claim 9, wherein the mould member is adapted to be removable from the frame, and further comprising a storage device for storing a plurality of mould members.

37. The system according to claim 9, wherein the mould member is adapted to be removable from the frame, and further comprising a memory for storing at least one history of a mould member.

* * * * *